United States Patent [19]
Eki et al.

[11] Patent Number: 5,853,562
[45] Date of Patent: *Dec. 29, 1998

[54] METHOD AND APPARATUS FOR ELECTROLYZING WATER

[75] Inventors: Toshio Eki; Akemi Kuroda; Toshiharu Otsuka; Yoshinobu Uchimura, all of Kita-kyushu, Japan

[73] Assignee: Toto Ltd., Fukuoka, Japan

[*] Notice: This patent issued on a continued prosecution application filed under 37 CFR 1.53(d), and is subject to the twenty year patent term provisions of 35 U.S.C. 154(a)(2).

[21] Appl. No.: 765,598

[22] PCT Filed: Jun. 30, 1995

[86] PCT No.: PCT/JP95/01310

§ 371 Date: Dec. 27, 1996

§ 102(e) Date: Dec. 27, 1996

[87] PCT Pub. No.: WO96/00700

PCT Pub. Date: Jan. 11, 1996

[30] Foreign Application Priority Data

Jun. 30, 1994 [JP] Japan ..................... 6-172066

[51] Int. Cl.⁶ ..................................... C02F 1/461
[52] U.S. Cl. ................. 205/743; 205/744; 204/228; 204/229; 204/275
[58] Field of Search ................. 205/743, 744; 204/228, 229, 275

[56] References Cited

U.S. PATENT DOCUMENTS 5,234,563  8/1993  Arai et al. ................ 204/229
5,328,584  7/1994  Erickson et al. .......... 204/229

FOREIGN PATENT DOCUMENTS

| 51-77584 | 7/1976 | Japan . |
| 55-91996 | 6/1980 | Japan . |
| 59-189871 | 12/1984 | Japan . |
| 1-203097 | 8/1989 | Japan . |
| 4-284889 | 10/1992 | Japan . |
| 5-220483 | 8/1993 | Japan ..................... 205/743 |
| 5-245473 | 9/1993 | Japan . |
| 6-339690 | 12/1994 | Japan . |

*Primary Examiner*—Arun S. Phasge
*Attorney, Agent, or Firm*—Finnegan, Henderson, Farabow, Garrett & Dunner, L.L.P.

[57] ABSTRACT

A method and an apparatus for electrolyzing water in which electrolysis of water can be carried out while effectively removing scales such as calcium carbonate and by which the service life of electrode can be extended on the order of several years. Repeated in sequence are a step wherein water is subjected to electrolysis while using an electrolytic cell of the membraneless type and a step wherein feed of water through the cell is stopped and an electric potential of reverse polarity is applied between electrodes while water stays stagnant in the cell whereby precipitate deposited on the electrodes during the electrolyzing step is removed by dissolving into stagnant water. Since application of the reverse potential is effected while water stays stagnant in the cell, the surface of the electrodes is free from the influence of turbulence and there is no risk that a layer of strongly acidic water generated at the surface of the electrodes is washed away by water flow. Accordingly, a layer of acidic water of the maximum strength is generated at the electrode-water interface whereby calcium carbonate precipitated on the electrode surface in the electrolysis step is released.

5 Claims, 8 Drawing Sheets

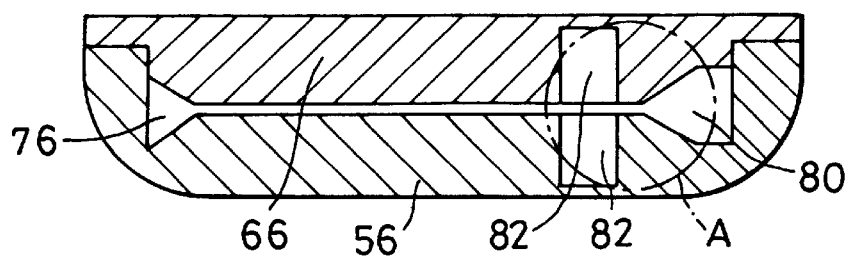
FIG. 7
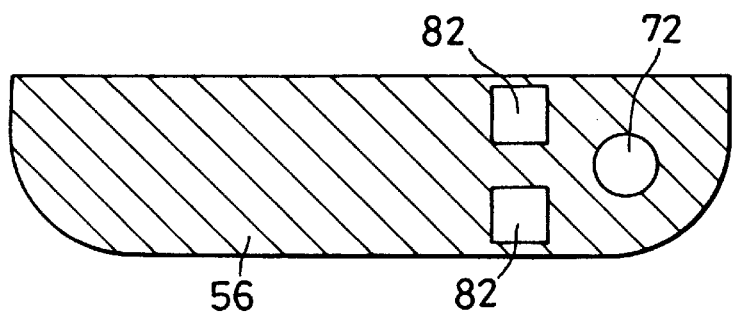
FIG. 8
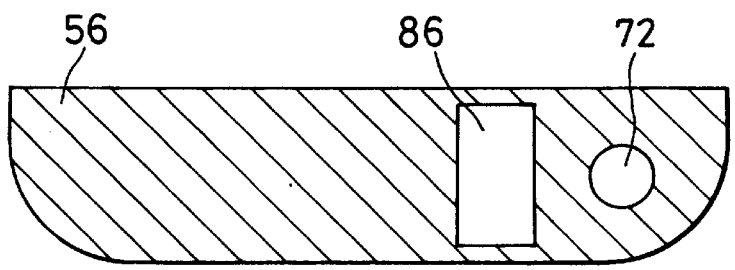
FIG. 9
FIG. 10
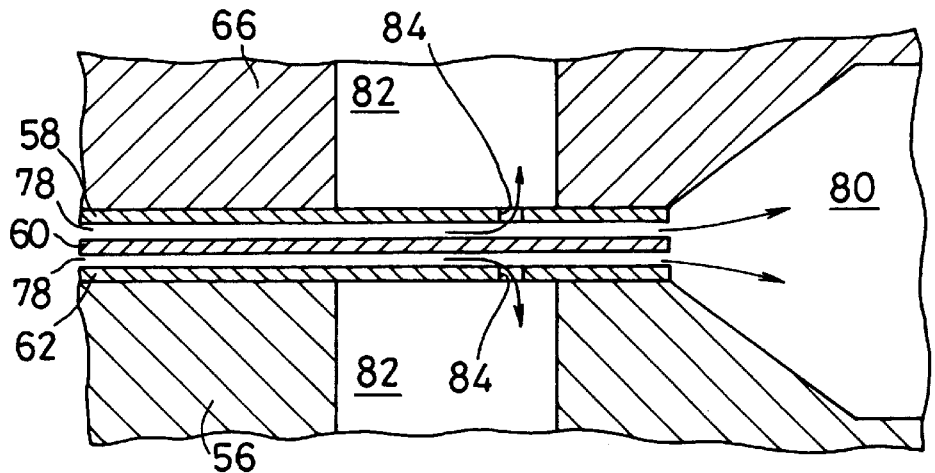

5,853,562

1

METHOD AND APPARATUS FOR ELECTROLYZING WATER

This application is a 371 of PCT/JP95/01310 filed Jun. 30, 1995.

TECHNICAL FIELD

The present invention relates to a method and an apparatus for electrolyzing water to electrochemically produce alkaline and/or acidic water. More specifically, the present invention is concerned with a method and an apparatus wherein water is subjected to electrolysis while effectively removing scales, such as calcium carbonate, deposited on electrodes and electrolytic cell.

BACKGROUND ART

It is believed that hydroxyl ion ($OH^-$) enriched alkaline water, which is often incorrectly referred-to as "alkaline ion water", is useful in health maintenance when served as potable water as well as in accentuating taste when used in cooking or for the preparation of beverages such as tea and coffee. Similarly, hydrogen ion ($H^+$) enriched acidic water is known as being suitable for boiling noodles and washing faces. More importantly, highly acidic water which is obtained by electrolysis of tap water containing sodium chloride or an aqueous solution of sodium chloride and which therefore contains effective chlorine (hypochlorous acid or chlorine gas) has been noted as having a strong germicidal effect.

To produce alkaline and/or acidic water, an apparatus for electrolyzing water has been used hitherto which is often incorrectly referred—to in the art as "ion water generator". This apparatus, designed to subject water to electrolysis, includes an electrolytic cell having an anode and a cathode. As a direct electric potential is applied between the electrodes, the hydroxyl ions $OH^-$ being present in water due to electrolytic dissociation of water molecules will donate electrons to the anode at the anode-water interface and are thereby oxidized to form oxygen gas which is then removed away from the system. As a result, the $H^+$ concentration is enhanced at the anode-water interface so that $H^+$ enriched acidic water is resulted at the anode-water interface. At the cathode-water interface, on the other hand, $H^+$ accepts electron from the cathode and is reduced to hydrogen to form hydrogen gas which is similarly eliminated from the system. As a result, the $OH^-$ concentration is increased whereby $OH^-$ enriched alkaline water is generated at the cathode side. When an aqueous solution of sodium chloride is subjected to electrolysis, chlorine gas is generated at the anode and is dissolved into water to form hypochlorous acid.

To preclude alkaline water and acidic water once generated by electrolysis from being mixed with each other and to take them out separately, the conventional electrolytic cells are typically provided with a water-impermeable but ion-permeable membrane 3 arranged between an anode plate 1 and a cathode plate 2 as schematically shown in FIG. 1, the electrolytic chamber being divided by the membrane into a flowpath 4 for alkaline water and a flowpath 5 for acidic water. The electrolytic cell of this type will be referred-to hereinafter as the "membrane-type" electrolytic cell.

As the electrolytic cell is operated, precipitation of scale 6 comprised of calcium carbonate, calcium hydroxide, magnesium hydroxide and the like takes place in the flowpath for alkaline water. Referring to FIG. 2 wherein the apparent solubility of calcium carbonate versus pH is shown, the mechanism of scale precipitation will be described with reference to calcium hydroxide by way of an example. It will be noted from the graph that under acid conditions, calcium carbonate is dissolved into water in the form of calcium ions. However, as the pH exceeds 8, the solubility is rapidly drops thereby giving rise to precipitation of calcium carbonate. In the electrolytic cell of the membrane type, the scale tends to precipitate predominantly on the membrane 3 rather than on the cathode 2, as shown in FIG. 1. Probably, this is because the porous nature of the membrane promotes precipitation of scale, in contrast to the cathode generally having a polished specular surface. Since the precipitates such as calcium carbonate are electrically insulating, the electrical resistance across the cell is increased thereby lowering the efficiency of electrolysis of the cell. In addition, formation of scale increases the flow resistance across the electrolytic cell. Therefore, unless the scale is removed, the electrolytic cell would become inoperative soon after a short period of use.

Accordingly, there has been proposed in the prior art to remove the precipitates by dissolving them into water as disclosed, for example, in Japanese Patent Kokai Publication 51-77584, Japanese Utility Model Kokai Publication 55-91996, Japanese Utility Model Kokai Publication 59-189871, and Japanese Patent Kokai Publication 1-203097. According to this method, a polarity reversal switch 7 is turned over in such a manner that an electric potential of an polarity opposite to the normal operating polarity is applied between the electrodes to thereby cause the precipitates to dissolve. This method is known in the art as "reverse electrolysis descaling" or "reverse potential descaling" process. The principle of reverse electrolysis descaling is that, upon application of electric potential of the opposite polarity, the flowpath for the alkaline water is changed into acidic conditions whereby the scale such as calcium carbonate is disintegrated into ions to again dissolve into water as will be understood from FIG. 2.

It is believed that in the method described in JP 51-77584, JP 55-91996, and JP 59-189871, application of the reverse polarity potential for descaling is carried out while water is fed to flow across the electrolytic cell. However, since the membrane 3 is more or less spaced from the electrodes as will be understood from FIG. 1, the stream of strongly acidic water which has been generated along the surface of the electrode 2 (originally acting as the cathode, but now acting as the anode because the polarity of potential is reversed) will be carried away by the flow of water flowing through the flowpath so that strongly acidic water could not reach the membrane as long as it is present in moving water. Therefore, with this method, the membrane cannot be rendered acidic to a degree strong enough to quickly dissolve the scale deposited on the membrane.

In the method proposed in JP 1-203097, on the contrary, the reverse polarity potential is applied when feed of water to the electrolytic cell is stopped. Obviously, this is to preclude the user from inadvertently drinking water that would otherwise be issued from the electrolytic cell during the reverse electrolysis descaling. As in this method the application of reverse voltage is carried out while flow of water is stopped, the hydrogen ions generated at the surface of the initial cathode 2 (now anode because the potential is reversed) will permeate through the membrane 3 and will be diffused toward the opposite flowpath so that acidic water and alkaline water once generated are mixed with each other and are neutralized. As a result, the membrane cannot be rendered strongly acidic. According to the experiment carried out by the present inventors, the pH of the flowpath 4 for alkaline water did not become less than 3 when the reversed polarity potential was applied while flow of water was stopped so that removal of scale was not observed even after about two days of application of the reversed polarity potential.

In this manner, in the "membrane-type" electrolytic cell, it has been difficult to electrochemically remove the scale even though the so-called reverse electrolysis descaling is carried out. Accordingly, it has been usual that the life of the electrolytic cells is only from a half to one year unless the cells are periodically disassembled and are subjected to manual mechanical descaling operations. Furthermore, the membrane is unhygienic since it serves as breeding bed for bacteria.

In order to overcome the foregoing disadvantages of the membrane-type electrolytic cell, proposed in Japanese Patent Kokai Publication 4-284889 is an electrolytic cell which is free from a membrane. The electrolytic cell of this type will be referred-to hereinafter as the "membraneless" type electrolytic cell. In the membraneless-type cell, the electrode plates are spaced from one another with a small gap in such a manner that a laminar flow is established as water flows between the electrodes. Therefore, alkaline water and acidic water as generated can be separated from each other without recourse to a membrane.

As the membraneless-type electrolytic cell is not provided with a membrane which is susceptible to deposition of scale, there is an advantage that less scale is deposited. The formation of scale takes place primarily on the cathode plate so that scale is extremely small in amount as compared with the membrane-type electrolytic cell. Moreover, the cell is hygienic because of the absence of a membrane which would otherwise breed bacteria.

The "membraneless" electrolytic cell of JP 4-284889 is also designed such that the reverse polarity potential is applied to carry out the so-called reverse electrolysis descaling in a manner similar to the conventional membrane-type electrolytic cells. Descaling is performed while water flow through the cell is maintained. To this end, a pressure responsive switch is provided to ensure that a polarity reversal switch is turned over to apply the reverse polarity voltage only when the presence of water pressure is detected.

In this way, in the membraneless electrolytic cell, also, the application of reverse polarity potential is carried out while water is flowing through the cell. Accordingly, the layer of strongly acidic water (e.g., highly acidic water having pH value of less than 1) which has once been generated at the surface of the electrode (i.e., the anode when the polarity of the voltage is reversed) will be carried away by the water flow as soon as it is generated and will be mixed with and diluted by the layer of weakly acidic water having a greater pH value. Furthermore, in the membraneless electrolytic cell, the laminar flow is not fully developed at the inlet or upstream region of the flowpath defined between the electrodes so that this region is subject to the influence of turbulence. Accordingly, it is difficult to generate strongly acidic water along the electrode surface located at the inlet region. For these reasons, the scale cannot be satisfactorily removed unless reverse electrolysis descaling is carried out quite frequently. According to the present inventors' experiment, the deposition of scale is prevented to a practically satisfactory degree when the reverse electrolysis descaling by application of reverse polarity potential is repeated for every 4 minutes of electrolysis.

However, to frequently apply the reverse polarity potential for the purpose of descaling is undesirable because the service life of the electrodes is drastically shortened. More specifically, the cathode is generally made of platinum coated titanium plate. During the course of ordinary electrolysis, the surface of the platinum coating is covered by a film of platinum oxide formed thereon. The film of platinum oxide is stable as long as a minus voltage is applied to the cathode. However, upon application of a plus voltage to the cathode for the purpose of reverse electrolysis descaling, platinum oxide is reduced into platinum whereupon it partly dissolves into water in the form of platinum ions. If chlorine ions are present in water, platinum ions will react therewith to form highly soluble platinum chloride which then readily dissolves into water. Therefore, the cathode plate is exhausted and damaged each time the reverse polarity potential is applied. In the case where the cathode is made from titanium plate without platinum coating or from a metal other than platinum, exhaustion of the cathode resulting from the reverse polarity potential application would be more significant.

In this manner, to increase the frequency of reverse voltage application in order to perfectly remove the scale will result in premature exhaustion of the electrode plates. If to the contrary the frequency of reverse voltage application is to be limited, the electrolytic cell will soon become unusable due to deposition of scale. In any case, according to the conventional methods, it was therefore impossible to prolong the overall service life of the electrolytic cell beyond a period on the order of years.

An object of the invention is to provide a method and an apparatus for electrolyzing water which permit use of an electrolytic cell for as a long period as several years and which, hence, are capable of extending the overall life of the cell.

Another object of the invention is to provide a method and an apparatus for electrolyzing water wherein water is electrolyzed while the scale is effectively removed and which are capable of extending the life of the electrodes.

DISCLOSURE OF THE INVENTION

The method for electrolyzing water according to the invention is characterized by repeating the steps of:
  subjecting water to electrolysis while using an electrolytic cell of the membraneless type; and,
  removing precipitates deposited on the electrodes during the electrolyzing step by stopping feed of water through the cell and by applying an electric potential of the opposite polarity between the electrodes while water in the cell stays stagnant to thereby cause the precipitates to dissolve into stagnant water.

As in this manner the application of the reverse potential is carried out while feed of water is stopped so that water in the cell stays stagnant, there is no risk that the surface of the electrodes is affected by turbulence and that the layer of strongly acidic water generated at the electrode surface is washed away by the flow of water. Accordingly, a layer of acidic water having the maximum strength is formed at the electrode-water interface. The layer of strongly acidic water acts to cause flocculent precipitates such as calcium carbonate and the like, which have precipitated on the electrode surface during the preceding electrolyzing sequence, to dissolve along the electrode-water interface. As a result, the physical and chemical bondage between the electrode and the precipitates is loosened thereby permitting the precipitates to be released from the electrode. For descaling, it will suffice that the reverse potential is applied for about a second. The flocculent precipitates that have thus been released from the electrode will be readily washed away when feed of water is restarted and will be discharged out of the cell.

According to the invention, the frequency of reverse potential descaling may be minimized since in this way the scale is effectively removed. It will suffice that the application of the reverse potential is carried out once a day. Therefore, according to the invention, the service life of the electrodes may be extended up to about 7 years.

In another aspect, this invention provides an apparatus for carrying out the foregoing water electrolyzing process. The apparatus comprises an electrolytic cell of the membraneless type, a DC power source, a reversal switch for reversing the polarity of potential applied between the electrodes, detection means for detecting feed of water through the cell, and control means, having a timer function, for controlling the reversal switch in response to the detecting means. The control means controls the reversal switch in such a manner that a DC potential of a predetermined polarity is applied between the electrodes while water is fed through the cell and that a DC potential of an opposite polarity is applied between the electrodes at a predetermined timing when feed of water through the cell is stopped. The application of the reverse voltage may be carried out everyday at night.

These features and advantages of the invention as well as other features and advantages thereof will become apparent from the following description.

BRIEF DESCRIPTION OF THE DRAWINGS

FIG. 7 is a cross-sectional view taken along the line VII—VII of FIG. 6, with electrodes and spacers being omitted for simplicity;

FIG. 8 is a cross-sectional view taken along the line VIII—VIII of FIG. 6;

FIG. 9 is a cross-sectional view taken along the line IX—IX of FIG. 6;

FIG. 10 is an enlarged view showing a part encircled by the circle A in FIG. 7;

BEST MODE FOR CARRYING OUT THE INVENTION

Figure 1:
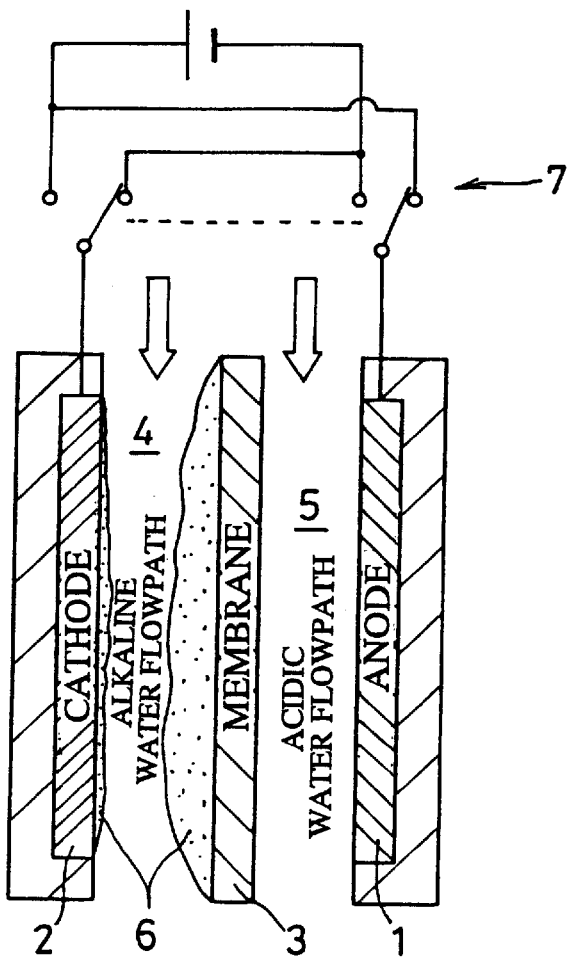
FIG. 1 is a schematic cross-sectional representation of the conventional membrane-type electrolytic cell.
Figure 2:
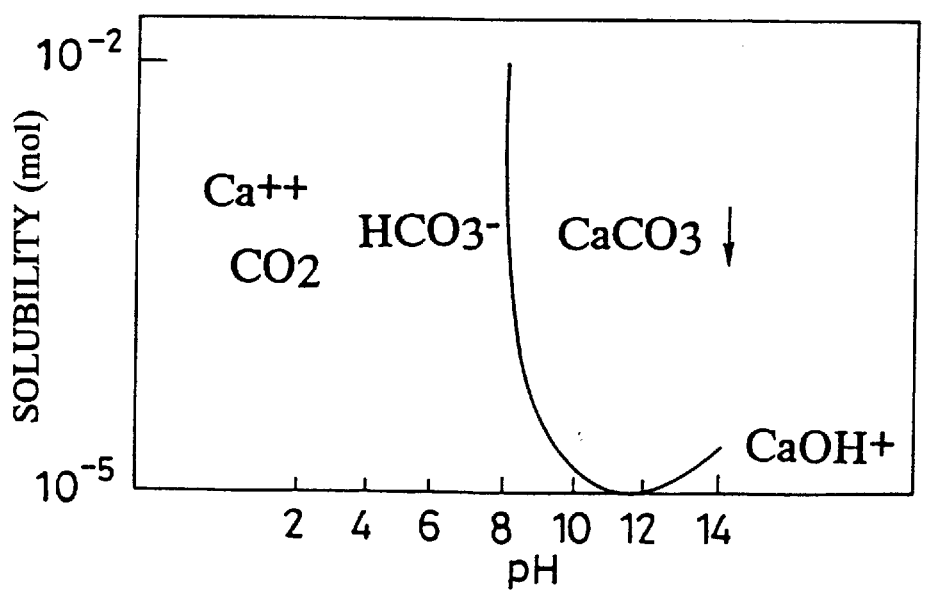
FIG. 2 is a graph showing the apparent solubility of calcium carbonate versus pH.
Figure 3:
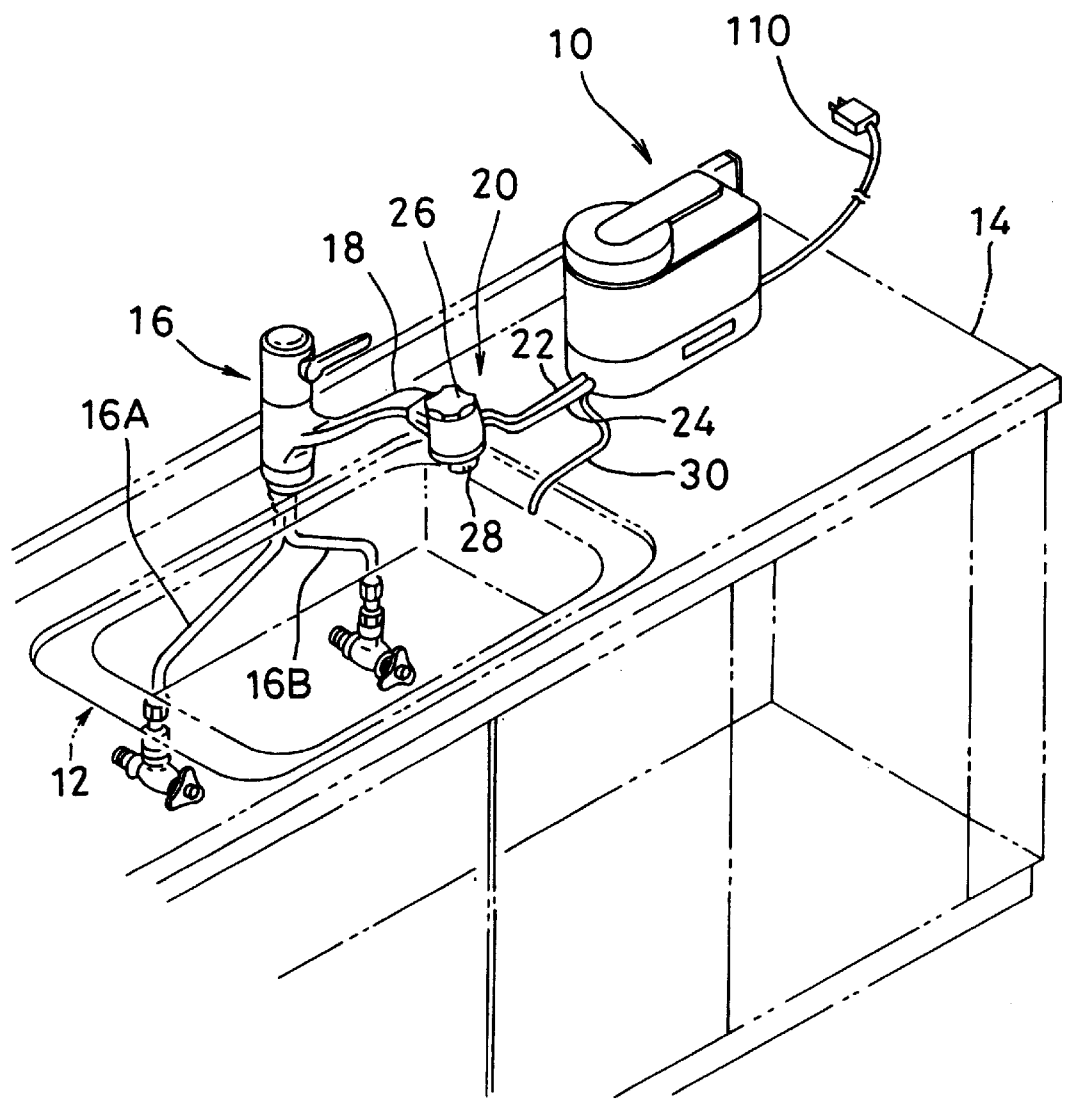
FIG. 3 is a perspective view showing an example of a water processing unit wherein the water electrolyzer according to the invention is incorporated.

The present invention will now be described in more detail with reference to the accompanying drawings showing an embodiment of the invention. In FIG. 3, there is shown a water electrolyzer embodying the invention as incorporated in a water purifier for domestic use.

Referring to FIG. 3, the water purifier or water processing unit 10 is designed for use as it is placed, for example, on a kitchen counter 14 equipped with a sink 12. In the illustrated layout, the sink is provided with a mixing valve 16 of the single-lever type to which hot water from a boiler (not shown) is supplied via a hot water piping 16A and tap water is applied through a water piping 16B connected to the public water line (not shown). Spout 18 of the mixing valve 16 is provided with a faucet adapter 20 wherein a flow control valve mechanism is arranged, the adapter 20 being connected to the processing unit 10 through a tap water supply hose 22 and a processed water delivery hose 24.

Upon rotating a handle 26 of the adapter 20 into a predetermined angular position, tap water from the mixing valve 16 will be forwarded through the supply hose 22 to the processing unit 10 and water after treatment will be returned via the delivery hose 24 to the adapter 20 for delivery through an outlet 28. Upon turning the handle 26 into another position, non processed water or a mixture thereof with hot water coming from the mixing valve 16 will be directly delivered from the outlet 28 of the adapter 20 upon bypassing the processing unit 10. Connected further to the processing unit 10 is a drain hose 30 which is adapted to discharge waste water occurred in the processing unit 10 to the sink 12.

Figure 4:
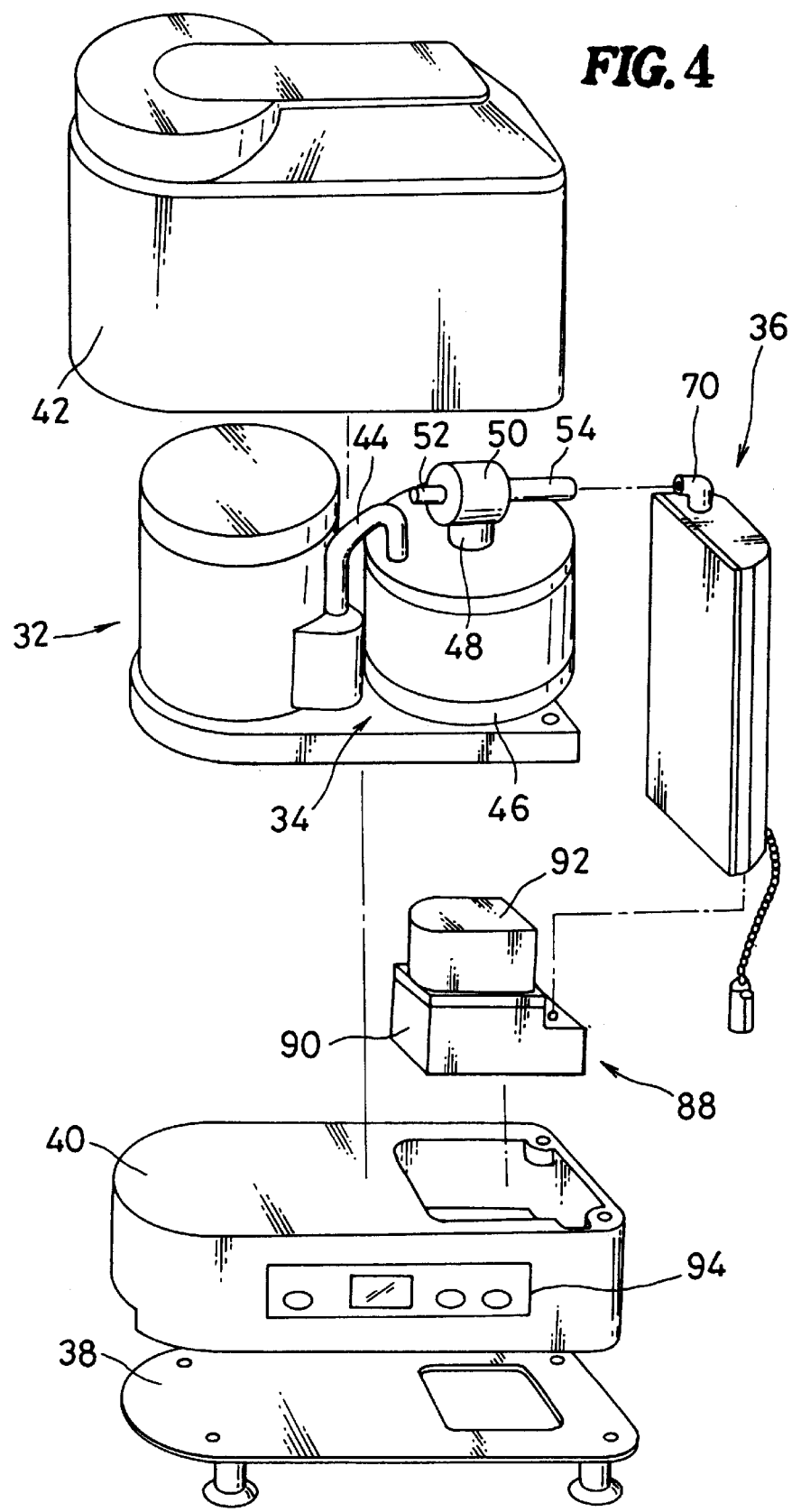
FIG. 4 is an exploded perspective view of the unit shown in FIG. 3.

Referring to FIG. 4, the water processing unit 10 is designed and constructed such that any particulate matters, such as ferrous rust and microorganisms, which are born in tap water are first removed by filtration, that any harmful or undesirable substances such as residual chlorine, trihalomethanes and smelly substances which are dissolved in tap water are then removed under the adsorption action of activated carbon, and that the thus purified water is further subjected to electrolysis to produce acidic and/or alkaline water at the user's discretion. To this end, the water processing unit 10 is comprised of a filtration stage 32 wherein a filter (not shown) such as hollow-fiber membrane filter is received, an adsorption stage including an activated carbon cartridge 34 wherein fibrous or granular activated carbon is received, and an electrolytic cell 36 for generating acidic or alkaline water. These components parts of the water processing unit are supported by a base 40 having a bottom plate 38 and are enclosed by an outer casing 42.

Tap water from the mixing valve 16 is forwarded via the supply hose 22 to the filtration stage 32, with filtered water being delivered through a hose 44 to the activated carbon cartridge 34. The activated carbon cartridge 34 is made of metal such as stainless steel and is provided at its bottom with an electric heater 46. Periodically or in response to the user operating a switch, the heater 46 is operated to heat the activated carbon cartridge 34. Upon heating, the activated carbon in the cartridge 34 will be boiled and sterilized and, at the same time, chlorine and trihalomethanes having been adsorbed by the activated carbon will be desorbed whereby the activated carbon is regenerated. A temperature-sensitive three-way valve 50 is disposed at the outlet 48 of the cartridge 34 so as to direct hot water and steam generated during regeneration of activated carbon toward an outlet 52 as well as to direct purified water toward another outlet 54 when the cartridge is not heated. The outlet 52 is connected to the drain hose 30 through hose and joint (not shown) so as to discharge hot water and steam toward the sink 12. The outlet 54 is connected to an inlet of the electrolytic cell 36 via a hose, not shown.

Figure 5:
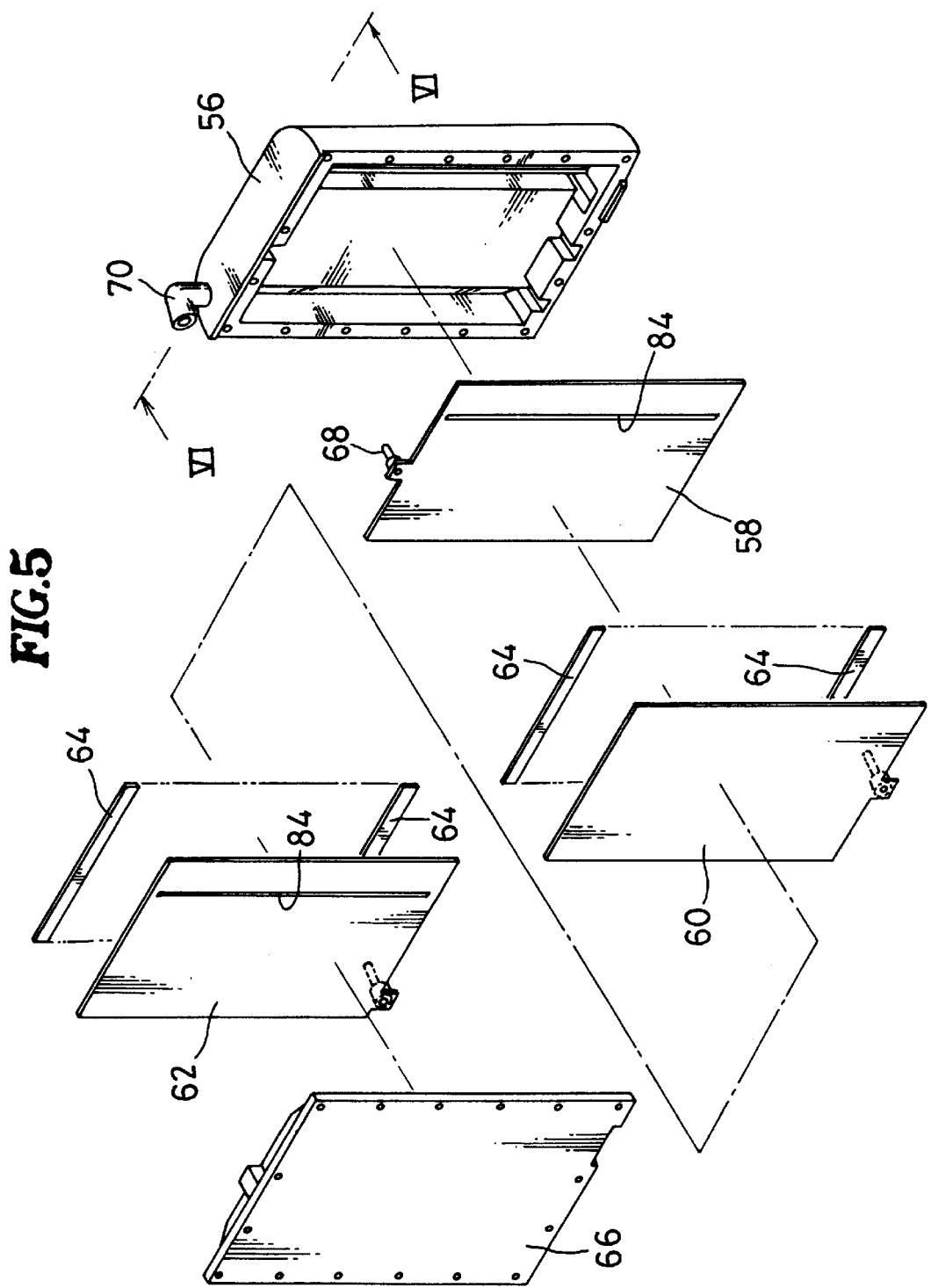
FIG. 5 is an exploded perspective view of the electrolytic cell shown in FIG. 4.

Referring to FIGS. 5–10, an embodiment of the electrolytic cell 36 will be described by way of an example. The electrolytic cell 36 is of the membraneless type and includes an elongated pressure-resistive casing 56 made of rigid plastics. As best shown in FIG. 5, the cell 36 is assembled by placing, in sequence, three planar electrodes (i.e., a first lateral electrode 58, a central electrode 60 and a second lateral electrode 62) in a recess of the casing 56 with a plurality of plastic spacers 64 sandwiched therebetween, followed by fluid tightly fastening a cover 66 by screws to the casing 56. Because a pair of lateral electrodes are arranged on both side of the central electrode 60, the cell 36 of this embodiment advantageously has a parallel twin structure. Each of the electrodes 58, 60 and 62 may be made of titanium plate coated with platinum and may have a size of about 5×13 cm. Preferably, the spacers 64 has a thickness of about 0.5 mm to ensure that the electrode spacing is equal to about 0.5 mm.

A terminal 68 is fixed to each of the electrodes for electrical connection to a DC power source via an electric cord. In a mode wherein alkaline water is to be produced, an electric potential of about 8V is applied in such a polarity that the lateral electrodes 58 and 62 serve as the anode and the central electrode 60 acts as the cathode. In another mode wherein acidic water is to be obtained, the electric potential is applied in a reversed polarity.

Figure 6:
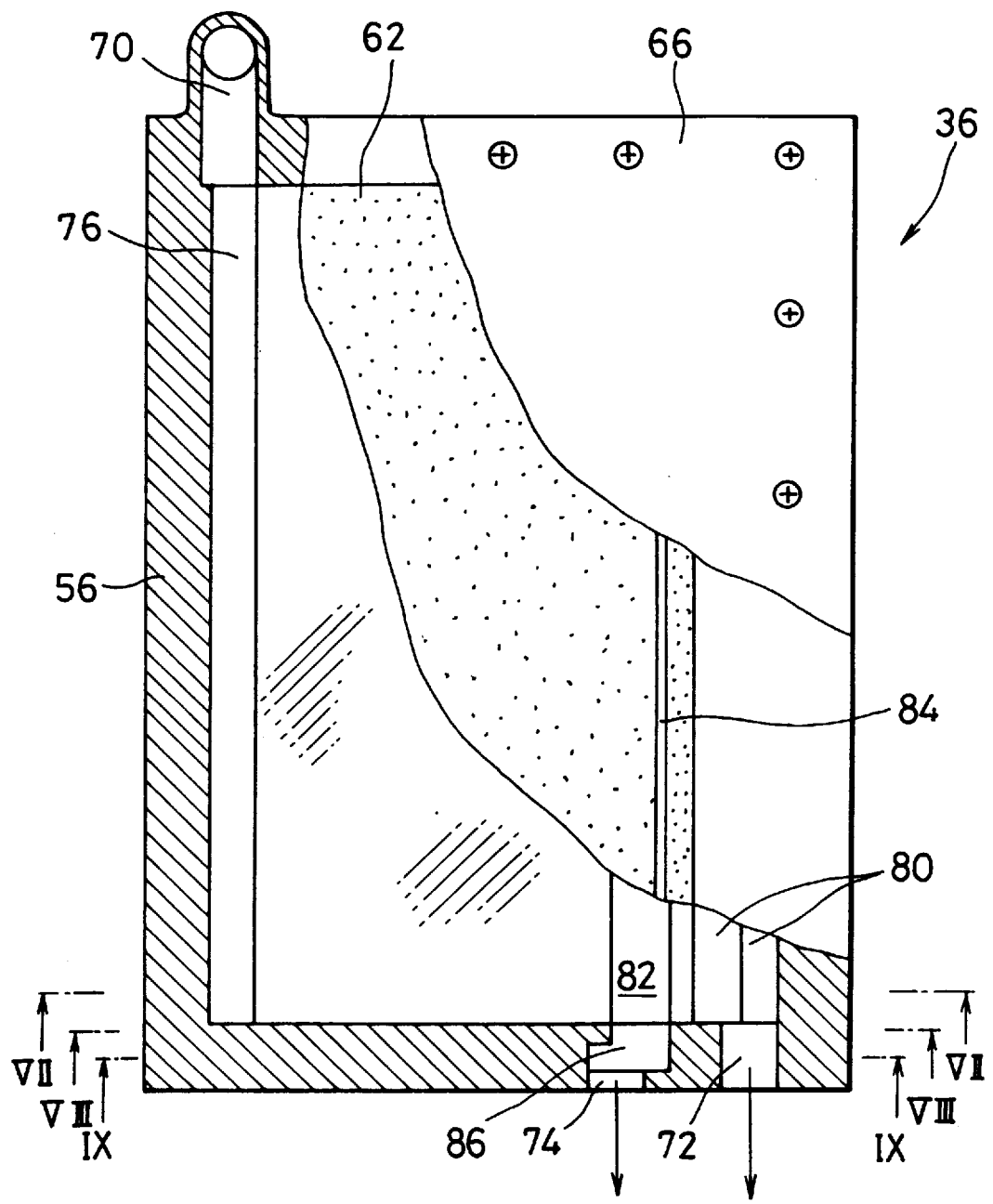
FIG. 6 is a cross-sectional view taken along the line VI—VI of FIG. 5 and showing the electrolytic cell as assembled.

As shown in FIG. 6, the casing 56 has an inlet 70 for purified water, a first outlet 72 for electrolyzed water, and a second outlet 74 for electrolyzed water, the first outlet operating as the outlet for alkaline water in the alkaline water delivery mode but operating as the outlet for acidic water in the acidic water delivery mode, the second outlet serving as the outlet for acidic water in the alkaline water delivery mode but serving as the outlet for alkaline water in the acidic water delivery mode. The inlet 70 is in fluid communication with a plenum chamber or water distribution passage 76 of a generally triangular cross-section. As best shown in FIG. 7, the plenum chamber 76 is defined by the casing 56 and the cover 66 and extends throughout the entire vertical length of the electrodes.

As shown enlarged in FIG. 10, a pair of flow paths 78 are formed on both sides of the central electrode 60. Each of the flow paths concerts with the electrodes to operate as the electrolytic chamber. A plurality of horizontally extending spacers 64 are sandwiched between the electrodes to ensure that water flowing down along the plenum chamber 76 flows into the flow paths 78 in the horizontal direction as shown in FIG. 10. Since the electrode spacing is so small as 0.5 mm, a laminar flow is established in the flow of water flowing through the flow paths 78 in the horizontal direction. Accordingly, acidic water and alkaline water which are generated respectively along the surfaces of the electrodes by electrolysis can be recovered separately, without providing a membrane between electrodes.

Electrolyzed water produced along the surfaces of the central electrode 60 is collected in a first collection passage 80 for electrolyzed water and is delivered through the first outlet 72. The first collection passage 80 is defined by the casing 56 and the cover 66 and extends throughout the entire vertical length of the electrodes in a manner similar to the plenum chamber 76. Electrolyzed water produced along the surfaces of the lateral electrodes 58 and 62 is recovered in second collection passages 82 for electrolyzed water. To this end, each of the lateral electrodes is provided with a slit 84 to ensure that the flow of electrolyzed water flowing along the surfaces of the lateral electrodes 58 and 62 is directed to flow into the second collection passages 82. Electrolyzed water recovered in the second collection passages 82 is forwarded to a connection port 86 for delivery from the second outlet 74.

Referring again to FIG. 4, a valve unit 88 is connected to the bottom of the electrolytic cell 36 so as to control the direction of two kinds of electrolyzed water (acidic water and alkaline water) flowing out of the outlets 72 and 74 of the cell 36. The valve unit 88 may be comprised of a rotary flow control valve 90 having a flow rate control function and an electrically driven actuator 92. A flow sensor for detecting the flow rate through the water processing unit 10 may be incorporated in the valve unit 88.

Referring further to FIG. 4, a control and display section 94 is provided at the base 40 of the processing unit 10. Also arranged within the base 40 is a control unit which is designed to control the electric heater 46 for regenerating activated carbon of the processing unit 10, the electrolytic cell 10 and a motor of the actuator 92.

Figure 11:
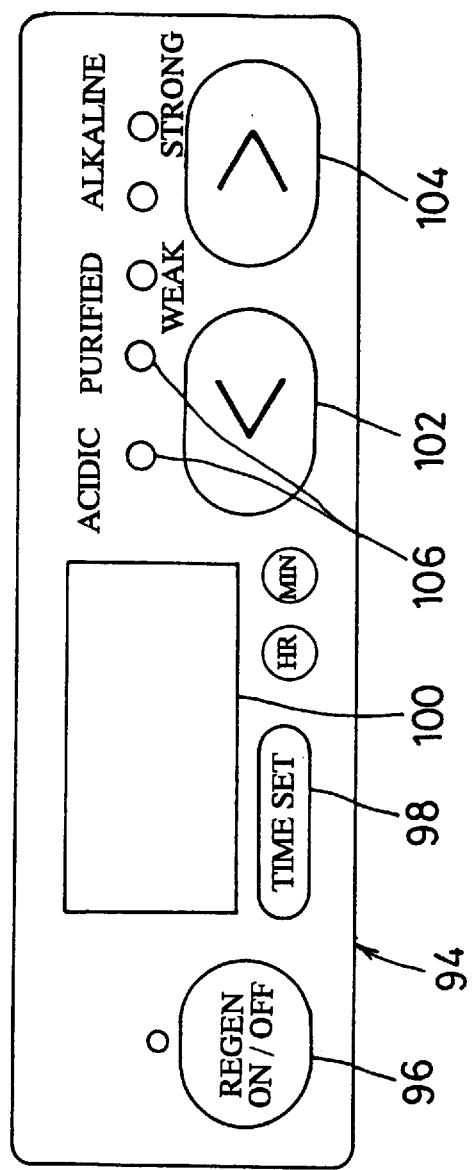
FIG. 11 illustrates an exemplary layout of a control and display panel of the water processing unit; and, FIG. 12 is a block diagram of the control unit of the water processing unit.

An example of the layout of the control and display section 94 is shown in FIG. 11. The control and display 94 may include a manual regeneration control switch 96 for commencing regeneration of activated carbon in the cartridge 34 in accordance with the instructions of the user, a regeneration time set switch 98 for setting the time at which regeneration of activated carbon is commenced in an automatic regeneration mode, a liquid crystal display panel 100, selection switches 102 and 104 to enable the user to select the kind of water to be delivered, and light emitting diodes 106 for indicating the selected water.

In the illustrated layout, the control and display section 94 is designed such that by operating the selection switch 102 or 104 the user may select either purified water processed by the filter 32 and the activated carbon cartridge 34, or acidic or alkaline water obtained by subjecting purified water further to electrolysis. The pH of alkaline water may be adjusted in three different levels including strong, medium and weak. The arrangement may be such that, for example, weakly acidic water of pH 6.5 is obtained in the acidic water delivery mode, whereas alkaline water of pH 8.5, pH 9.0 or pH 9.5 is obtained in the alkaline water delivery mode.

Figure 12:
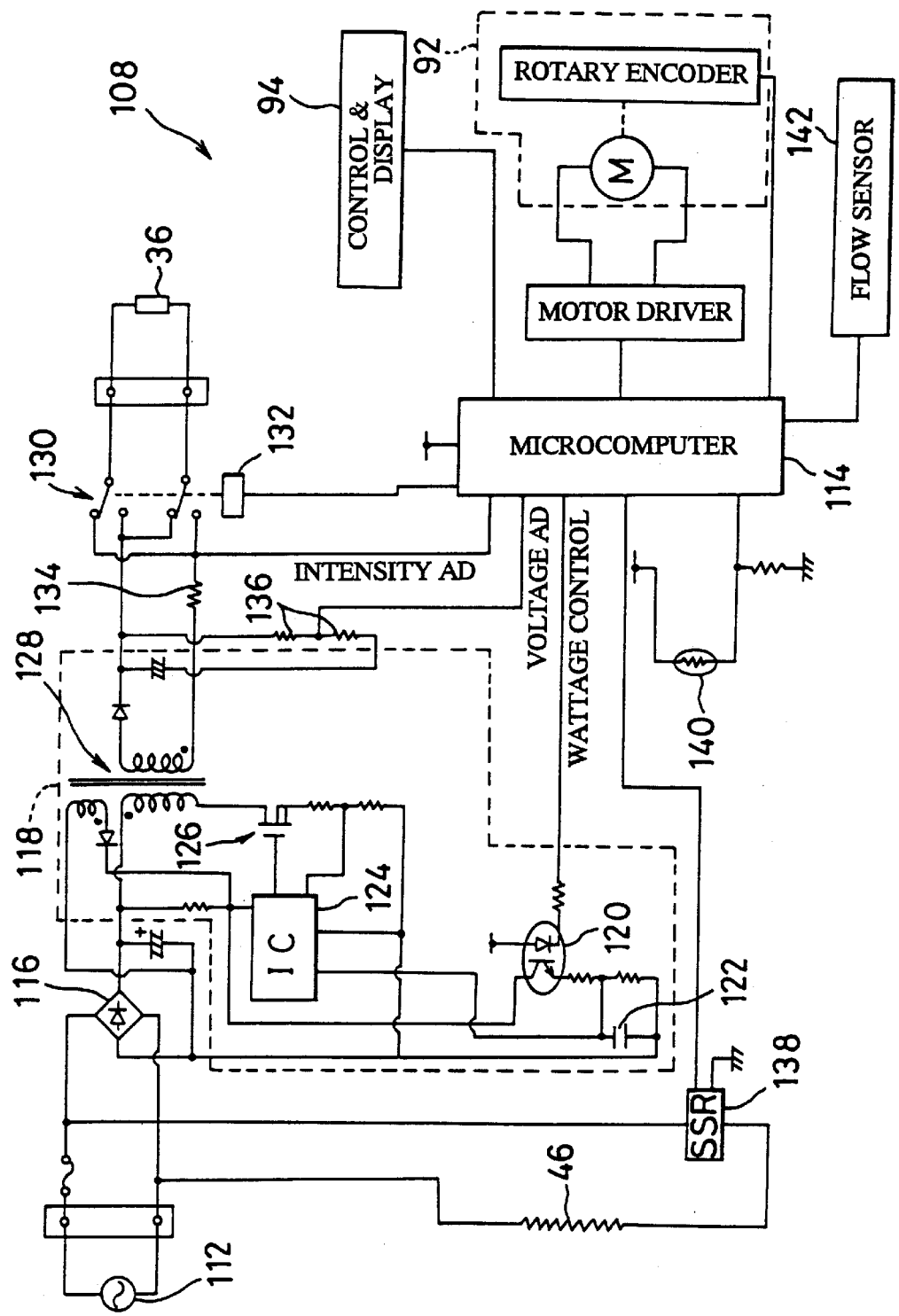

In FIG. 12, there is shown an embodiment of the control unit of the water processing unit 10. An electric power is applied to the control unit 108 from a commercial AC power source 112 via a cable 110 (FIG. 3). The control unit 108 includes a programmed microcomputer 114 which is programmed in such a manner as to control the power as well as the polarity of the direct current supplied to the electrolytic cell 36, to control the motor of the actuator 92 for switching the destination of water delivered from the cell 36, and to control the power supply to the heater 46 intended to regenerate the activated carbon cartridge 34.

The control unit 108 has a diode bridge 116 for full-wave rectifying the alternating current from the power source 112 and a switching power circuit 118. Briefly, the control unit 108 is designed and constructed such that in accordance with various operating parameters the microcomputer 114 theoretically computes the desired power consumption of the electrolytic cell 36 and that the microcomputer 114 feedback controls the switching power circuit 118 in such a manner that the power actually supplied to the cell is equal to the desired power consumption. More specifically, the switching power circuit 118 includes a photocoupler 120, a capacitor 122 for smoothing the output of the latter, an integrated circuit 124 having a pulse width modulation function, a switching transistor 126 and a switching transformer 128.

The alternating current from the commercial power source 112 is full-wave rectified by the diode bridge 116, the DC output of which is applied to the primary winding of the switching transformer 128. The pulse width of the direct current flowing the primary windings of the switching transformer 128 is controlled by the switching transistor 126 driven by the IC 124 so that an electric current having a wattage proportional to the pulse duty of the primary windings is induced in the secondary winding of the switching transformer 128. The secondary winding of the switching transformer 128 is connected to the electrodes of the electrolytic cell 36 through a reversal switch 130 designed to reverse the polarity of the voltage. The reversal switch 130 is controlled by a relay 132 which is in turn controlled by the microcomputer 114.

A resistor 134 for detecting the intensity of current flowing through the cell is connected in series to the lead wires connecting the cell 36 and the switching transformer 128, and a pair of resistors 136 for detecting the voltage applied to the cell are connected in parallel to the lead wires. The junctions to these resistors 134 and 136 are connected to input terminals of analog-to-digital converter of the microcomputer to ensure that the microcomputer 114 periodically checks the potential at these junctions to detect the intensity and the voltage of electric current supplied to the electrolytic cell.

The control unit 108 further includes a solid state relay (SSR) 138 for controlling power supply to the heater 46 for regenerating activated carbon, the relay being adapted to be controlled by the microcomputer 114. A thermistor 140 is held in contact with the bottom of the activated carbon cartridge 34 to detect the temperature of the cartridge bottom, the output signal of the thermistor 140 being applied to the microcomputer 114.

The valve unit 88 is provided with a flow sensor 142 for detecting the flow rate of water flowing through the water processing unit 10, the output of the sensor being applied to the microcomputer 114. The flow sensor 142 is used to detect the cumulative amount of feed to the processing unit 10, to determine the desired power consumption in accordance with the detected flow rate, and to detect the presence or absence of water feed. However, in the case that only the presence or absence of water feed is to be detected, a pressure sensor responsive to water pressure may by used in lieu of the flow sensor 142.

Through a motor driver circuit, the microcomputer 114 drives the motor of the actuator 92 having a reduction gear mechanism. A rotary encoder incorporated in the actuator 92 detects the angular position of the final stage output shaft of the reduction gear mechanism and sends a signal to the microcomputer 114. The microcomputer 114 controls the actuator 92 in response to the signal from the rotary encoder to thereby control the rotary valve 90 whereby the destination of two kinds of electrolyzed water (acidic water and alkaline water) flowing out of the outlets 72 and 74 of the cell 36 is changed over.

To describe the mode of operation and use of the water processing unit 10, when the user operates the control switch 102 or 104 to select "purified water", the microcomputer 114 drives the actuator 92 until the two outlets 72 and 74 of the cell 36 are connected to the water delivery hose 24.

In this mode wherein purified water is delivered, no electric power is applied to the electrolytic cell 36. As the user rotates the handle 26 (FIG. 3) to connect the valve 16 to the water processing unit 10 and opens the valve 16, tap water is purified as it flows through the hollow-fiber membrane filter 32 and the activated carbon cartridge 34 so that purified water is sent through the cell 36, which is now inactivated, to the water delivery hose 24 for delivery from the outlet 28.

If the user selects "alkaline water", the flow control valve 90 will be rotated into such a position wherein the first outlet 72 of the cell 36 is connected to the delivery hose 24, with the second outlet 74 of the cell 36 connected to the drain hose 30, and wherein the flow rate of water flowing from the first outlet 72 of the cell 36 to the delivery hose 24 is equal to 4 liters per minute and the flow rate of water flowing from the second outlet 74 of the cell 36 to the drain hose 30 is equal to 1 litter per minute.

In the alkaline water delivery mode, an electric potential of about 8V is applied to the electrolytic cell 36 in such a polarity that the central electrode 60 functions as the cathode and the lateral electrodes 58 and 62 serve as the anode. As a result, alkaline water is generated along the surfaces of the cathode 60 and is forwarded to the first outlet 72 of the cell, with acidic water being produced along the surfaces of the anodes 58 and 62 and forwarded to the second outlet 74. The power supply to the cell 36 is controlled by the microcomputer 114 such that water of the desired pH (e.g., pH 8.5, pH 9.0 or pH 9.5) selected by the user is delivered. Alkaline water thus produced is sent via the delivery hose 24 to the faucet spout.

The embodiment shown is designed so that acidic water produced during operation in the alkaline water delivery mode is discharged through the drain hose 30 into the sink. It will be noted, however, that in this mode strongly acidic water containing hypochlorous acid and chlorine gas is generated along the anodes 58 and 62 upon electrolysis of sodium chloride. Strongly acidic water containing hypochlorous acid and chlorine gas will similarly be produced if salt is added to incoming water. Such strongly acidic water sent to the drain hose 30 is bactericidal and may be recovered from hose 30 for use as germicidal water.

When the user has selected "acidic water", the relay 132 is energized to switch over the reversal switch 130 so that an electric power is supplied to the cell 36 in such a polarity that the central electrode 60 acts as the anode and the lateral electrodes 58 and 62 serves as the cathode. Accordingly, acidic water is obtained at the first outlet 72 of the cell 36 and alkaline water is delivered from the second outlet 74. The flow control valve 90 is rotated into a position wherein the flow rate of water flowing from the first outlet 72 of the cell 36 to the delivery hose 24 is equal to 3 liters per minute and the flow rate of water flowing from the second outlet 74 of the cell 36 to the drain hose 30 is equal to 2 liters per minute.

As the electrolytic cell 36 is operated, calcium carbonate and the like will precipitate on the surface of the electrode which has been served as the cathode. Therefore, according to the invention, an electric potential of the polarity which is in reverse to the polarity of the previous operation is periodically applied to dissolve precipitates to thereby remove scale. It is preferable that the descaling operation by way of reverse potential application is carried out automatically whenever the preset time for regeneration of activated carbon fixed by the regeneration time set switch 98 has arrived. This is because the user is generally recommended to preset the regeneration time at a timing, such as at night, at which the water processing unit 10 is not in use.

Preferably, water that flows out of the cell 36 during descaling is discarded since it contains dissolved substances and, hence, is not proper to drink. Accordingly, upon arrival of the preset time, the flow control valve 90 is rotated to a position in which the totality of water issuing from the cell 36 is forwarded to the drain hose 30. The microcomputer 114 then checks the signal from the flow sensor 142 to see if water is being fed to the processing unit 10. In the absence of water feed, the reversal switch is reversed further from the position of the previous operation so as to apply to the electrodes of the cell 36 an electric potential having a polarity which is in reverse to the polarity of the previous operation. While it will suffice that application of the reverse potential is carried out for about a second, it may be continued for about 5 minutes. Upon application of the reverse voltage, precipitates deposited on the electrodes during the previous sequence of generating alkaline or acidic water will be released from the electrodes as mentioned before.

Upon completion of the application of reverse potential, the microcomputer 114 of the control unit 108 commences power supply to the heater 46 of the cartridge 34. As the heater 46 is energized, water in the cartridge boils up so that activated carbon in the cartridge 34 is boiled and sterilized. At the same time, chlorine ions and volatile substances such as trihalomethanes adsorbed by the activated carbon are desorbed so that activated carbon is regenerated. The temperature at the bottom of the cartridge 34 detected by the thermistor 140 will be raised as water in the cartridge 34 and water impregnated in the activated carbon are evaporated. Upon sensing that the bottom of the cartridge exceeds, for example, 120° C., the microcomputer 114 terminates power supply to the heater 46.

EXAMPLE

The membraneless electrolytic cell as shown in the accompanying drawings was build and was subjected to an accelerated test which is equivalent to 7 years of operation and wherein tap water of Chigasaki City of Japan containing about 20 ppm of calcium ion was electrolyzed while performing the reverse electrolysis descaling by applying reverse potential. After each sequence of electrolysis for from 1 to 30 minutes at a flow rate of alkaline water of 4 liters per minute and a flow rate of acidic water of 1 liter per minute, the reverse electrolysis descaling by application of reverse polarity potential was carried out for 0 to 300 seconds either in the stopped or flowing water condition. The effect of the reverse electrolysis descaling was assessed in two aspects; whether alkaline water of the desired pH value (pH 9.5) was obtainable and whether there was prescription of the scale. The results are shown in the following tables wherein the mark "X" indicates that formation of prescipitates occurred and that the pH was lowered, while the mark "O" represents that no precipitate was observed and that the pH remained stable.

| Duration of Descaling (sec) | Duration of Electrolysis (min) | | | |
|---|---|---|---|---|
| | 1 | 4 | 15 | 30 |
| a) Reverse Electrolysis Descaling under Stopped Water | | | | |
| 0 | X | X | X | X |
| 1 | O | O | O | X |
| 30 | O | O | O | O |
| 300 | O | O | O | O |
| b) Reverse Electrolysis Descaling under Flowing Water | | | | |
| 0 | X | X | X | X |
| 1 | X | X | X | X |
| 30 | O | O | X | X |
| 300 | O | O | O | X |

From the tables above, it will be noted that the formation of precipitates is very little in the case where the reverse electrolysis descaling is carried out while water feed through the cell is stopped. For example, deposition of precipitate may be avoided for 7 years provided that 30 seconds of reverse electrolysis descaling is carried out under stopped water condition after every 30 minutes of electrolysis.

In summary, according to the invention, scale such as calcium carbonate is effectively removed without shortening the life of the electrodes. As a result, the overall life of the electrolytic cell is remarkably extended. In fact, according to the invention, the life of the electrolytic cell was prolonged up to about 7 years.

While the present invention has been described herein with reference to the specific embodiments thereof, it is contemplated that the invention is not limited thereby. For example, the filtration stage 32 and the activated carbon cartridge 34 of the water processing unit 10 may be omitted and the design and structure of the electrolytic cell 36 may be changed or modified. The cycle and frequency of reverse potential application may be altered as required.

We claim:

1. A method for electrolyzing water that extends the life of the electrodes, characterized by repeating in sequence the steps of:

subjecting water to electrolysis by feeding water through an electrolytic cell having a pair of electrodes facing with each other without intervention of a membrane therebetween and by applying a DC potential of a first polarity between said electrodes; and removing precipitates deposited on the electrodes during the preceding step by stopping feed of water through the cell and by applying a DC potential of a second polarity opposite the first polarity between said electrodes while water between the electrodes stays stagnant and whereby precipitates are dissolved into the stagnant water.

2. A method for electrolyzing water according to claim 1, wherein said step of removing precipitates is carried out at least once a day.

3. A method for electrolyzing water according to claim 2, wherein application of the potential of an opposite polarity in said step of removing precipitates is carried out each time for at least about a second.

4. An apparatus for electrolyzing water that extends the life of the electrodes, comprising:

a membraneless electrolytic cell having a pair of electrodes and through which water is fed;

a DC power source for applying a DC potential between said electrodes;

a reversal switch for reversing the polarity of potential applied between the electrodes;

detecting means for detecting feed of water through the cell; and, control means, having a timer function, for controlling said reversal switch in response to said detecting means;

said control means controlling said reversal switch in such a manner that a DC potential of a first polarity is applied between the electrodes while water is fed through the cell and that after the feed of water through the cell is stopped a DC potential of a second polarity opposite the first polarity is applied to stagnant water between the electrodes for a time sufficient to dissolve precipitants into the stagnant water.

5. An apparatus for electrolyzing water according to claim 4, wherein said control means operates said reversal switch such that a DC potential of the second polarity is applied between the electrodes everyday at night for a period of time when feed of water through the cell is stopped.

* * * * *